United States Patent
Bailey

[11] 3,879,880
[45] Apr. 29, 1975

[54] FISHING DEVICE

[75] Inventor: Ralph I. Bailey, Newell, W. Va.

[73] Assignee: The Raymond Lee Organization, Inc., New York, N.Y. ; a part interest

[22] Filed: Nov. 29, 1973

[21] Appl. No.: 419,913

[52] U.S. Cl. .............................................. 43/17
[51] Int. Cl. ............................................. A01k 97/12
[58] Field of Search ......................................... 43/17

[56] References Cited
UNITED STATES PATENTS

| | | | |
|---|---|---|---|
| 2,785,494 | 3/1957 | Eaton | 43/17 |
| 2,973,599 | 3/1961 | Olson | 43/17 |
| 3,120,072 | 2/1964 | Rybarski | 43/17 |
| 3,359,673 | 12/1967 | Roemer | 43/17 |

Primary Examiner—Louis G. Mancene
Assistant Examiner—Daniel J. Leach
Attorney, Agent, or Firm—Daniel Jay Tick

[57] ABSTRACT

A fishing device comprises a support tube having a base mounted at one end of the tube for supporting the tube substantially vertically. A lamp is mounted at the other end of the tube. Energizing means in the tube energizes the lamp and comprises a source of electrical energy and a circuit comprising electrical conductors connecting the source of energy to the lamp. A fish-controlled switch is connected in an electrical conductor for opening and closing the circuit. A fish hook is mounted on the free end of a fishing line wound on a fishing reel mounted on the support tube. A switch actuating device is mounted on the tube, is coupled to the fish-controlled switch, and supports the fishing line in a manner whereby when a fish bites on the hook and pulls the line, the line closes the switch via the actuating device to energize the lamp.

2 Claims, 1 Drawing Figure

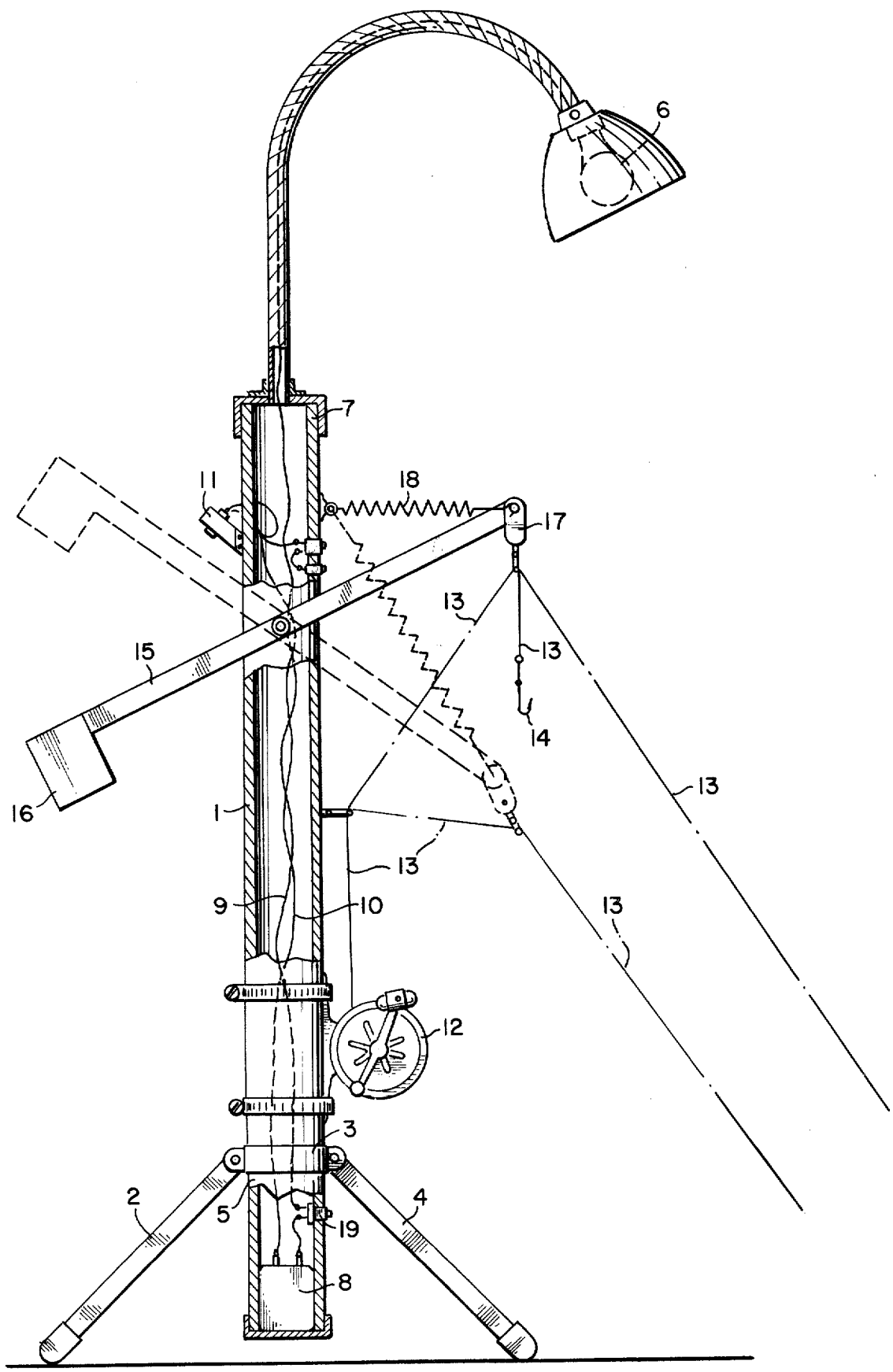

FISHING DEVICE

DESCRIPTION OF THE INVENTION

The present invention relates to a fishing device.

Objects of the invention are to provide a fishing device of simple structure, which is easy, convenient and simple to use and which permits fishing under any circumstances during any time of day in any season or weather condition with convenience, effectiveness and reliability.

In order that the invention may be readily carried into effect, it will now be described with reference to the accompanying drawing, wherein the single FIGURE is a view, partly in section, partly cutaway, of an embodiment of the fishing device of the invention.

The fishing device of the invention comprises a support tube 1. A base arrangement 2, 3, 4 is mounted at one end 5 of the tube 1 for supporting the tube substantially vertically.

A lamp 6 is mounted at the other end 7 of the tube 1. An energizing arrangement in the tube 1 energizes the lamp 6 and comprises a source of electrical energy such as, for example, a battery or storage battery 8, and a circuit comprising electrical conductors 9 and 10 connecting the source of energy to the lamp.

A fish-controlled switch 11 is connected in the electrical conductor 10 and functions to open and close the circuit.

A fishing reel 12 is mounted on the support tube 1. A fishing line 13 is wound on the reel 12. A fish hook 14 is affixed to the free end of the fishing line 13.

A switch actuating device 15, 16, 17, 18 is mounted on the tube 1, is coupled to the fish-controlled switch 11, and supports the fishing line 13 in a manner whereby when a fish bites on the hook 14 and pulls the line 13, the line closes the switch 11 via the actuating device 15, 16, 17, 18 to energize the lamp 6. Although the switch actuating device is shown in the Figure as a pivotally mounted arm 15 having a flag or weight 16 at one end and a fishing line supporting device 17 at the other end coupled to the tube via a spring 18, any suitable arrangement which functions to close the switch 11 when the fishing line is pulled would serve the purpose of the fishing device of the invention.

A manually operable switch 19 is connected in the electrical conductor 9 and functions to selectively open and close the circuit.

While the invention has been described by means of a specific example and in a specific embodiment, I do not wish to be limited thereto, for obvious modifications will occur to those skilled in the art without departing from the spirit and scope of the invention.

I claim:

1. A fishing device, comprising a support tube;

base means mounted on one end of the tube for supporting the tube substantially vertically;

a flexible neck extending from the other end of the tube;

a lamp mounted at the free end of the flexible neck;

energizing means in the tube for energizing the lamp comprising a source of electrical energy and a circuit comprising electrical conductors connecting the source of energy to the lamp;

a fish-controlled switch connected in an electrical conductor for opening and closing the circuit;

a fishing reel removably clamped to the support tube;

a fishing line wound on the reel;

a fish hook at the free end of the fishing line; and switch actuating means mounted on the tube, coupled to the fish-controlled switch and supporting the fishing line in a manner whereby when a fish bites on the hook and pulls the line, the line closes the switch via the actuating means to energize the lamp, said switch actuating means comprising an arm pivotally mounted on the tube having a weight at one end and a fishing line supporting device at the other end and a spring coupling the other end of the arm to the tube, the fish-controlled switch having contact means on the tube operated when abutted by the one end of the arm.

2. A fishing device as claimed in claim 1, further comprising a manually operable switch connected in an electrical conductor for selectively opening and closing the circuit.

* * * * *